US012800238B2

(12) United States Patent
McCormick et al.

(10) Patent No.: US 12,800,238 B2
(45) Date of Patent: Nov. 17, 2026

(54) HEAT EXCHANGER

(71) Applicant: HS Marston Aerospace Limited, Wolverhampton (GB)

(72) Inventors: John Patrick McCormick, Wolverhampton (GB); Christopher Arthur McNab, Staffordshire (GB); Berwyn Owain Pollard, Wolverhampton (GB); Stuart Anthony Astley, Wolverhampton (GB)

(73) Assignee: HS Marston Aerospace Limited, Wolverhampton (GB)

( * ) Notice: Subject to any disclaimer, the term of this patent is extended or adjusted under 35 U.S.C. 154(b) by 70 days.

(21) Appl. No.: 18/766,341

(22) Filed: Jul. 8, 2024

(65) Prior Publication Data

US 2025/0035387 A1 Jan. 30, 2025

(30) Foreign Application Priority Data

Jul. 25, 2023 (EP) .................................... 23275110

(51) Int. Cl.
*F28F 3/02* (2006.01)
*B23P 15/26* (2006.01)

(52) U.S. Cl.
CPC .............. *F28F 3/025* (2013.01); *B23P 15/26* (2013.01)

(58) Field of Classification Search
CPC ......... F28F 3/025; F28F 3/027; F28F 2215/04
See application file for complete search history.

(56) References Cited

U.S. PATENT DOCUMENTS

| | | | | |
|---|---|---|---|---|
| 2,952,445 | A | 9/1960 | Ladd | |
| 4,941,530 | A | 7/1990 | Crowe | |
| 10,451,360 | B2 | 10/2019 | Zager et al. | |
| 2005/0274501 | A1* | 12/2005 | Agee | F28F 13/14 165/146 |
| 2010/0089546 | A1 | 4/2010 | Perez et al. | |
| 2011/0132570 | A1 | 6/2011 | Wilmot | |
| 2017/0144767 | A1* | 5/2017 | Mayo | F28D 9/0062 |
| 2018/0045471 | A1* | 2/2018 | Dietrich | B22F 5/10 |
| 2019/0277576 | A1* | 9/2019 | Toubiana | F28D 9/0081 |

FOREIGN PATENT DOCUMENTS

| | | | | |
|---|---|---|---|---|
| CN | 112506995 | A | 3/2021 | |
| DE | 102006031676 | A1 * | 1/2008 | F28F 13/12 |
| FR | 3030707 | A1 | 6/2016 | |
| FR | 3066812 | A1 | 11/2018 | |

OTHER PUBLICATIONS

Extended European Search Report for EP Application No. 23275110.7, dated Feb. 7, 2024, 7 pages.

* cited by examiner

*Primary Examiner* — Eric S Ruppert
(74) *Attorney, Agent, or Firm* — Kinney & Lange, P.A.

(57) ABSTRACT

A layer of a plate-fin heat exchanger includes: an inlet side for receiving a fluid; an outlet side; a plurality of first fins each having a first end located at the inlet side and extending in a direction toward the outlet side to a second end to provide a plurality of first flow channels for the fluid; a plurality of second fins each having a first end adjacent to the second end of the plurality of first fins and extending from the second end of the plurality of first fins toward the outlet side to a second end to provide a plurality of second flow channels for the fluid; and a cavity provided in each of the plurality of first fins and/or each of the plurality of second fins at a boundary between the plurality of first fins and the plurality of second fins.

20 Claims, 7 Drawing Sheets

HEAT EXCHANGER

CROSS-REFERENCE TO RELATED APPLICATION(S)

This application claims priority to European Patent Application No. EP23275110.7, filed on Jul. 25, 2023, the content of which is incorporated herein by reference in its entirety.

TECHNICAL FIELD

The present disclosure relates to a layer of a plate-fin heat exchanger and a method of manufacturing a plate-fin heat exchanger.

BACKGROUND

Heat exchangers for transfer of heat between different fluids are very widely used and exist in various forms. Typically heat exchangers are arranged for flow of a primary fluid and a secondary fluid with heat being transferred between the two fluids as they flow through the device. Multi-stream heat exchangers for exchanging heat between more than two fluids also exist in the prior art. Heat exchangers are required within aircraft structures to regulate temperatures of working fluids, and the systems and components they occupy, as well as to extract heat from one system for use in another. Every heat exchanger consumes significant space within an aircraft structure, including in certain areas of the aircraft structure where space is at a premium. It is therefore desirable to provide an optimised heat exchanger such that the maximum amount of heat transfer can take place within a given envelope. It is also beneficial for the heat exchangers to be optimized in size while still providing efficient heat transfer so that they can fit within the space required.

Some heat exchangers have a layered structure with a large number of parallel flow paths between plates that separate the flow paths. There may be 50-200 plates, or more, in this type of heat exchanger, typically with alternating hot/cold fluid flow paths on either side of each plate. Such heat exchangers can be referred to as laminate heat exchangers or plate-fin heat exchangers.

Heat exchanger plates general comprise features to promote heat transfer and/or turbulent flow of the fluids such as protrusions extending outward from the body of the plates into the flow of fluid forming a secondary surface, in addition to the plate, which is in contact with the fluid in order to increase the surface area for heat transfer to take place within a given envelope. These features are referred to generally as fins, which includes various geometries of fins forming chambers within the flow passages, such as straight-finned triangular or rectangular arrangements; herringbone, where the fins provide a zig-zag path by effectively running parallel with the flow direction, but with an alternating left-right tilt; serrated and/or perforated fins, which include cuts and perforations in the fins to augment flow distribution and improve heat transfer; as well as fins that include an array of pins formed as columnar shapes extending outward from the body of the plates, typically normal to the plane of the plates. These columnar shapes may be referred to individually as pins or fins, and heat exchangers using this type of arrangement are generally described as fin heat exchangers.

In order to improve the heat transfer efficiency, the plates and the fins are required to be manufactured from lightweight and thin material to allow for maximum heat transfer.

However, this can mean that the fins may be easily damaged. There is therefore a desire to protect the delicate geometry of the fins while retaining the improved heat transfer properties.

SUMMARY

Viewed from a first aspect, there is provided a layer of a plate-fin heat exchanger including: an inlet side for receiving a fluid; an outlet side; a plurality of first fins each having a first end located at the inlet side and extending in direction towards the outlet side to a second end to provide a plurality of first flow channels for the fluid; a plurality of second fins each having a first end adjacent to the second end of each of the plurality of first fins and extending towards the outlet end to a second end to provide a plurality of second flow channels for the fluid; and a cavity provided in each of the plurality of first fins and/or each of the plurality of second fins at the boundary between the plurality of first fins and the plurality of second fins.

The plurality of first fins may include guard fins arranged to protect the plurality of second fins from impact.

The plurality of first fins may be formed of a stronger material than the plurality of second fins.

The cavity may be formed in an end surface of each of the first plurality of fins and/or each of the second plurality of fins, and the end surface may be substantially perpendicular to the direction of the fluid in use.

The plurality of first flow channels may have a first geometry and the plurality of second flow channels may have a second geometry different from the first geometry.

The cavity may be arranged to provide a transition region for the air flow in use as it travels from the first geometry defined by the plurality of first fins and the second geometry of the plurality of second fins.

The cavity may include a concave depression.

The plurality of second fins may include herringbone-shape fins.

The layer may include a plurality of third fins each having a first end adjacent to the second end of each of the plurality of second fins and extending to a second end at the outlet side to provide a plurality of third flow channels for the fluid.

The plurality of third flow channels may have a third geometry which is the same as the first geometry.

The cavity may be a first cavity, and the layer may include a second cavity in each of the plurality of second fins and/or each of the plurality of third fins at the boundary between the plurality of second fins and the plurality of third fins.

The plurality of third fins may be formed of the same material as the plurality of first fins.

The plurality of third fins may be arranged to protect the plurality of second fins from impact on the outlet side.

Viewed from a second aspect, there is provided a plate-fin heat exchanger including a plurality of layers as described in the first aspect above.

Viewed from a third aspect, there is provided a method of manufacturing a layer of a heat exchanger as described in the first aspect above, the method including: providing a base plate; connecting the plurality of first fins to the base plate; connecting the plurality of second fins to the base plate; joining the second end of each of the plurality of first fins to the first end of each of the plurality of second fins; and forming a cavity in each of the plurality of first fins and/or each of the plurality of second fins at the boundary between the plurality of first fins and the plurality of second fins.

The step of forming the cavity may include using machining techniques including one of cutting, milling or abrasion.

BRIEF DESCRIPTION OF THE DRAWINGS

Certain embodiments of the present disclosure will now be described, by way of example only, with reference to the accompanying drawings, in which.

DETAILED DESCRIPTION

Figure 1A:
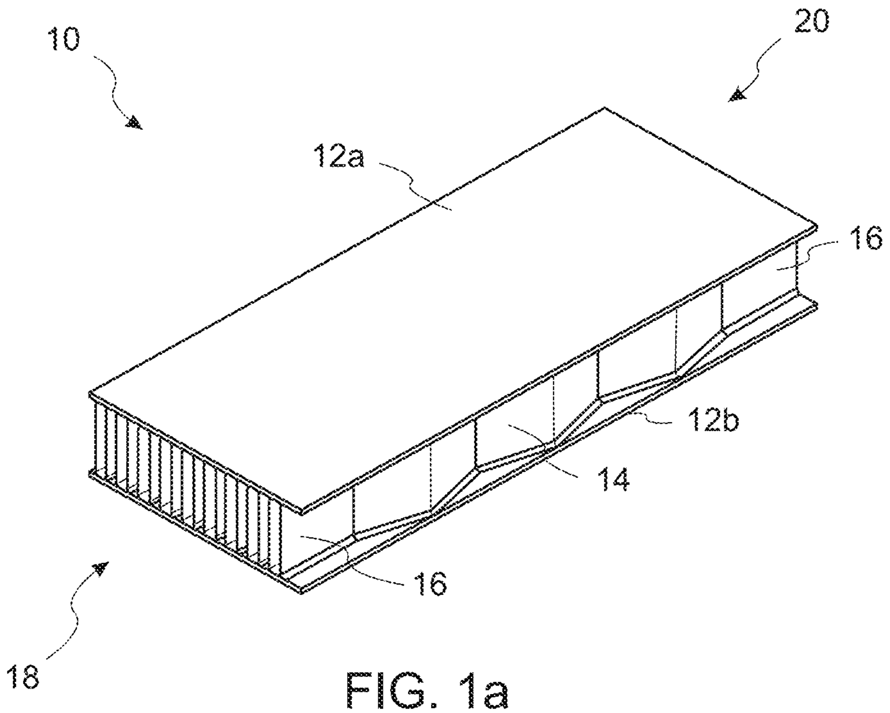
FIG. 1*a* shows a perspective view of a layer of a plate-fin heat exchanger.
Figure 1B:
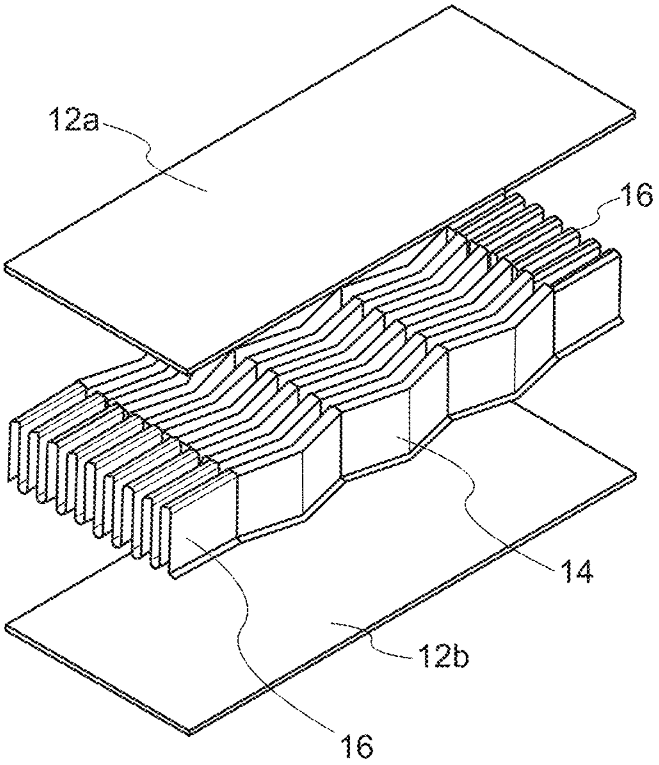
FIG. 1*b* shows an exploded view of the layer of a plate-fin heat exchanger shown in FIG. 1*a;*

FIG. 1*a* shows a single layer 10 of a plate-fin heat exchanger comprising an inlet end 18 and an outlet end 20. FIG. 1*b* shows an exploded view of the same layer 10 of a plate-fin heat exchanger.

The layer 10 depicted in FIGS. 1*a* and 1*b* may be part of a plate-fin heat exchanger comprising a plurality of layers 10, for example, the heat exchanger may comprise between 50 to 200 of said layers 10.

The heat exchanger layer 10 includes a base plate 12*b* and a top plate 12*b* and a plurality of fins 14, 16 extending between the base plate 12*b* and top plate 12*a*. Each of the fins 14, 16 extend in perpendicular direction relative to the base plate 12 and along the length of the plates 12*a*, 12*b* in a general direction between the inlet side 18 and the outlet side 20.

Each of the plurality of fins 14, 16 may be connected to each plate 12*a*, 12*b* by any means. For example, the fins 14, 16 may be brazed or welded to the plates 12*a*, 12*b*. Alternatively, the fins 14, 16 may be integrally formed with one of the plates 12*a*, 12*b* and then brazed or welded to the other of the plates 12*a*, 12*b*. As a further alternative the fins 14, 16 may be integrally formed with both of the plates 12*a*, 12*b*. This integral form can be products using additive manufacturing methods, or more conventional subtractive manufacturing techniques.

When the layer 10 is part of a stack of layers 10 to form a plate-fin heat exchanger, a further set of fins 14, 16 may extend in a perpendicular direction away from the top plate 12*a* towards a further plate (not shown). Effectively, the top plate 12*a* of the present layer 10 forms the base plate for the adjacent layer of the plate-fin heat exchanger. The further set of pins fins 12, 14 may be connected to the top plate 12*a* by the same means as discussed above in connection with the connections provided for the plurality of fins 14, 16 forming the original layer 10.

Each layer 10 of the plate-fin heat exchanger is arranged to constrain alternating fluid types, typically alternating between hot and cold fluid. The plates 12*a*, 12*b* of each layer 10 form the boundary between the two flow types of adjacent layers, and the fins 14, 16 extend into the flow path defined by each layer of the heat exchanger.

The heat exchanger layer 10 may be arranged such that a fluid enters the channels between the fins 14, 16 via the inlet side 18 and travels along the length of the layer 10 to the outlet side 20 of the layer 10. This process takes place in each layer 10 of the plate-fin heat exchanger with alternating fluid types in each layer 10 of the heat exchanger.

The plate-fin heat exchanger may operate in a parallel flow configuration whereby each fluid type travels the same direction in every layer. In this scenario, the inlet sides 18 of each layer 10 of the plate-fin heat exchanger will be on the same side of the plate-fin heat exchanger, and consequently, the outlet side 20 of each layer will be on the opposite side of the plate-fin heat exchanger.

Alternatively, the plate-fin heat exchanger may operate in a cross-flow or counter-flow configuration whereby the fluid types travel in opposite directions in each alternating layer 10 or in directions which are perpendicular to each other in each alternating layer 10.

In addition to the layers 10, the plate-fin heat exchanger will include inlet and outlet header arrangements to supply the necessary fluid to the inlets 18 and remove the fluid form each layer via the outlets 20. In more detail, the heat exchanger may include a first fluid inlet header and a second fluid inlet header. The first fluid inlet header may be connected to a source of first fluid, which may be a cold fluid, and may provide the first fluid to the inlets 18 of each layer arranged to convey the first fluid. Meanwhile, the second fluid inlet header may be connected to a source of second fluid, which may be a hot fluid, to the inlets 18 of each layer arranged to convey the second fluid.

Similarly, the heat exchanger may include a first fluid outlet header and a second fluid outlet header. The first fluid outlet header may be configured to receive a first fluid from the outlets 20 of the layers arranged to convey the first fluid and transfer the first fluid to the required destination. Meanwhile, the second fluid outlet header may be configured to receive a second fluid from the outlets 20 of the layers arranged to convey the first fluid and transfer the first fluid to the required destination.

Heat is transferred between the two fluid types within adjacent layers of the heat exchanger due to the heat transfer from a first fluid, e.g. hot fluid, to the fins 14, 16 and then to the base plate 12 of the layer which in turn transfers the heat to the fins 14, 16 of the adjacent base plate 12. The fins 14, 16 also work to promote a turbulent flow through each of the layers which further improves the heat transfer.

The fins 14, 16 of the layer 10 include two distinct types of fins. In the present example, the heat exchanger layer 10 includes a central section which includes a plurality of herringbone-shaped fins 14 which provide a plurality of zig-zag channels for the airflow to move through the heat exchanger layer 10. It will be appreciated that the herringbone-shaped fins 10 are one example and any fin arrangement could be present. For example, the fins of the central section may include straight or plain fins which provide straight or rectangular flow channels for the airflow.

The herringbone-shaped fins 14 provide improved heat transfer as they promote boundary layer separation along the flow path. The presence of a boundary layer effectively provides an insulating effect between the flow and the surface of the fin, and therefore disrupting the boundary layer through vortex separation promoted by the herringbone geometry will greatly increase the heat transfer between the fluid and the fins. In addition, due to the zig-zag nature of the herringbone-shaped fins 14, the contact time between the surface of the fins 14 and the fluid for a given length is increased resulting in higher heat transfer.

In order to further improve the heat transfer between fluids in adjacent plates 10, the herringbone-shaped fins 14 are manufactured with a reduced thickness. This allows the maximum number of fins 14 to be provided within a given width of the heat exchanger layer 10, therefore increasing the surface area of the fins 14 in contact with the fluid for a given envelope. In addition, the herringbone-shaped fins 14 having a small thickness means that they can more easily be formed into the herringbone shape. However, the disadvantage of this is that it results in the herringbone-fins being easily damaged.

Heat exchangers are typically positioned in areas which may be exposed to airflow. For example, the heat exchanger may be located within a ram duct of an aircraft and may therefore receive air directly from the bypass fan of a gas turbine engine; alternatively it may be located in a separate duct of an engine such as a turbo-prop and be exposed directly to outside air. This airflow may carry debris from the atmosphere, such as ice or hail, which could damage the herringbone-shaped fins 14 upon impact. In addition to impact damage, the herringbone-shaped fins 14 may also be vulnerable to damage caused during the handling of the heat exchanger during its assembly and/or fitting within the aircraft. As a further problem, the location of certain heat exchangers may be inaccessible, or at least difficult to access, which can mean maintenance or replacement of any damaged heat exchangers would be a complicated process and time-consuming process. Accordingly, there is a need to ensure that the herringbone-shaped fins 14 are adequately protected such that their working lifetime is increased and the overall maintenance required to the heat exchanger is reduced.

In order to protect the delicate herringbone-shaped fins 14, the layer 10 includes a plurality of guard fins 16 located at the inlet side 18 of the layer 10. The guard fins 16 comprise a more robust material which is thicker and stiffer than the material used in the herringbone-shaped fins 14 and is able to absorb the shock from impact received by any debris or during the handling of the heat exchanger and limit the damage to the herringbone-shaped fins 14.

The guard fins 16 and the herringbone-shaped fins 14 may be connected to each other at their respective end surface. However, as an alternative arrangement, each of the fins 14, 16 may be connected to the base plate only, and there may be no direct connection between the guard fins 16 and the herringbone-shaped fins 14. In this instance, the respective ends of the guard fins 16 and the herringbone-shaped fins 14 may simply be adjacent to each other. In either case, the area at which the respective ends of the guard fins 16 and the herringbone-shaped fins 14 are adjacent or connected to each other may be considered the boundary or join between the guard fins 16 and the herringbone-shaped fins 14.

FIGS. 1*a* and 1*b* depict the guard fins 16 at the inlet end 18 and outlet end 20 of the layers.

Figure 2A:
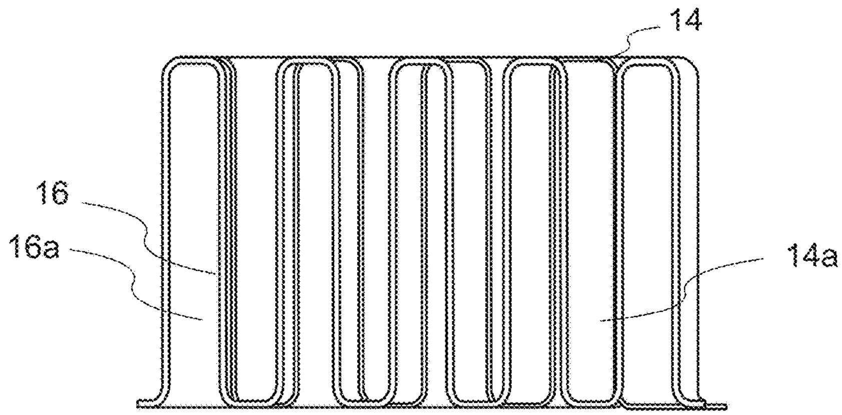
FIG. 2*a* shows the inlet end of a layer of a plate-fin heat exchanger.
Figure 2B:
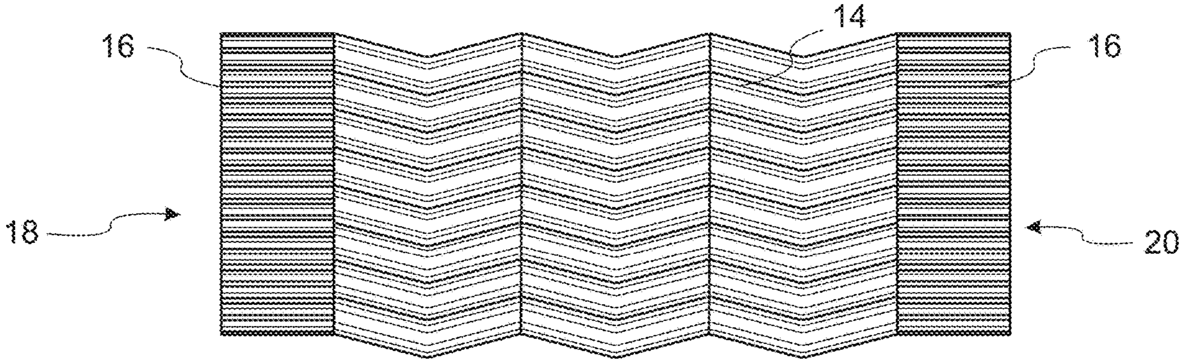
FIG. 2*b* shows a plan view of a layer of a plate-fin heat exchanger.

As shown in FIGS. 2*a* and 2*b* the flow channels 16*a* defined by the guard fins 16 have a first geometry and the flow channels 14*a* defined by the herringbone-shaped fins 14 have a second geometry. The first geometry is typically different to the second geometry, and/or the flow channels 16*a* defined by the guard fins 16 do not align with the flow channels 14*a* defined by the herringbone-shaped fins 14 due to the difference in material thickness for each fin 14, 16 type. This means that in use the airflow will move from one geometry to another which can result in a large pressure drop in the flow and reduce the heat transfer efficiency of the heat exchanger.

Additionally, given the difference between the first geometry and the second geometry there is a high likelihood that the flow paths would be misaligned which can lead to further losses in pressure.

Figure 3A:
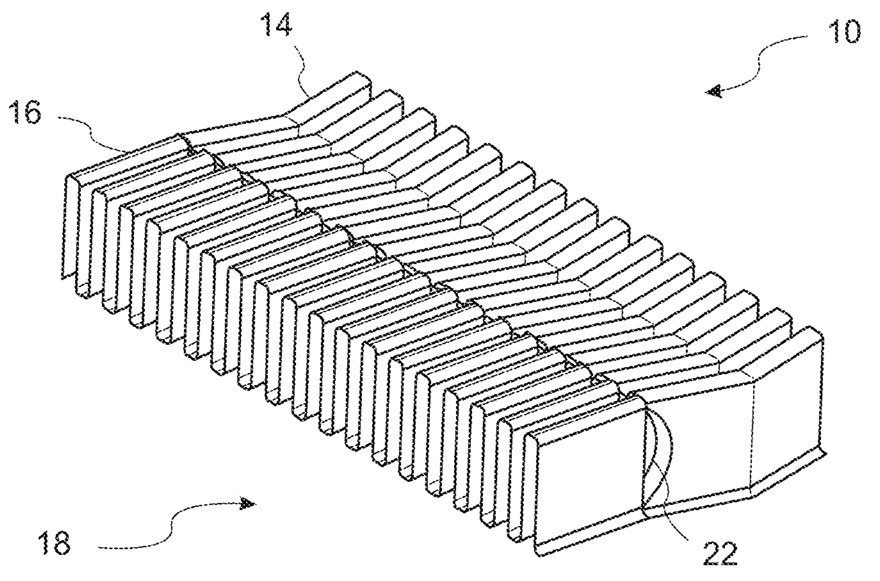
FIG. 3*a* shows a perspective view of an inlet end of a plate of a plate-fin heat exchanger.
Figure 3B:
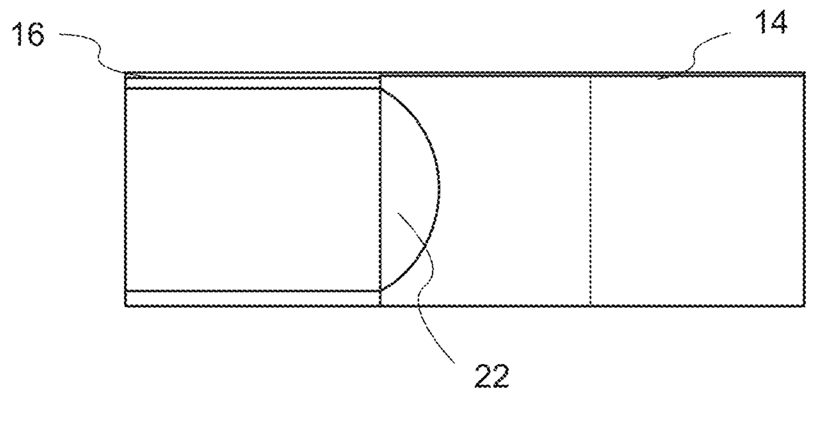
FIG. 3*b* shows a side view of the inlet end of a plate-fin heat exchanger.

In order to reduce this pressure drop, and improve the flow, a cavity 22 is provided at the boundary or junction between each of the guard fins 16 and the herringbone-shaped fins 14 as shown in FIGS. 3*a* and 3*b*. This cavity 22 may be provided in one or both of the guard fins 16 and the herringbone-shaped fins 14 at the boundary between the fins 14, 16. However, in the present example, the cavity 22 is provided in the herringbone-shaped fins 14 at each boundary or junction between the two fin types 14, 16.

Moreover, said cavity 22 is provided at each point where the guard fins 16 are joined to the fins 16 along the entire width of the heat exchanger layer 10.

The cavity 22 may be a depression in a surface of the fins 14, 16, wherein said surface in which the cavity 22 is located may be substantially perpendicular to the direction of air flow during use.

The result of a cavity 22 being present at each boundary or junction between the respective fins 14, 16 is effectively a continuous channel extending across the width of the heat exchanger layer 10 at the boundary or junction between the guard fins 16 and the herringbone-shaped fins 14.

The cavity 22 is arranged to provide a transition region for the airflow such that air flow entering the inlet side 18 of the heat exchanger passes through the flow channels 16*a* defined by the guard fins 16 with the first geometry, and then enters the respective cavities 22 formed at the boundary or junction between the guard fins 16 and herringbone-shaped fins 14, before entering the flow channels 14*a* defined by the herringbone-shaped fins 14 having the second geometry.

The resultant transition for the air flow smooths out any pressure changes that may occur as the air flow moves from the first geometry to the secondary geometry as it provides a more gradual change between the first and second geometries. In other words, the cavity acts as a plenum for the flow so there is no immediate loss in pressure as the flow transitions from the first to second geometry. Instead, the flow is allowed to settle within the cavity before gradually entering the flow paths formed by the herringbone-shaped fins 14. This also has the effect of reducing vortex shedding at the inlet to the herringbone-shaped finds 14 which further reduces the pressure drop.

Accordingly, the pressure drop in the air flow moving between the two fins 14, 16 is reduced compared to a heat exchanger layer 10 without the cavities 22.

Furthermore, the presence of a cavity 22 at the boundary between the guard fins 16 and the herringbone-shaped fins 14 improves the impact and handling protection provided by the guard fins 16 as it provides a “crumple zone” for the fins 14, 16 before the herringbone-shaped fins 14. In operation, the debris may impact upon an outer end of the guard fins 16 which may impart a force in the direction of the herringbone-shaped fins 14. Due to the presence of the cavity 22, this force is not transferred directly to the herringbone-shaped fins 14, and there is an area of empty spaced provided by the cavity in which the guard fins 16 may move, or crumple, under impact pressure before the herringbone-shaped fin 14 are impacted.

As a further advantage, the presence of the cavities 22 allows for thermal expansion to take place during use. In view of the fact that the guard fins 16 and the herringbone-shaped fins 14 include different materials and thickness, during use each they may each expand and contract at different rates and at different times. Accordingly, the present of a cavity 22 at the boundary between the two fin 14, 16 types allows them to expand and contract accordingly without impacting the adjacent fins 14, 16.

It will be appreciated that the herringbone-shaped fins 14 are merely one example for the fins forming the central section of the heat exchanger. Accordingly, the discussion above regarding the provision and location of the cavity 22 may be applicable to any type of fin, not only a herringbone-shaped fins. For example, the central section of the heat exchange layer 10 may include straight fins.

In the present example, the cavity 22 is provided in each of the herringbone-shaped pins fins 16 at the point adjacent to the guard fins 14, i.e. at the boundary or junction between the guard fins 16 and the herringbone-shaped fins 14. More specifically, the cavity 22 is located at the junction between the guard fins 14 and the herringbone-shaped fins 14 at the inlet side 18 of the heat exchanger layer 10.

As noted above, the cavity 22 in the present example is located in the herringbone-shaped fins 14. However, it will be appreciated that the cavity 22 may be formed in the surface of the guard fins 14. As a further alternative, a cavity 22 may be present in both the guard fins 16 and the herringbone-shaped fins 14. In this case, the cavity 22 located in the guard fins 16 may be aligned with the cavity 22 of the respective herringbone-shaped fins 14.

The cavity 22 in the present example is scallop-shaped. In other words, the cavity 22 has a concave shape such that it curves inwards in the direction the air flow is configured to flow in use. It may alternatively be termed a concave depression in the surface of one or more of the fins 14, 16. The cavity 22 may therefore have a substantially semi-circular cross section when viewed from the side of the heat exchanger layer as depicted in FIG. 3*b*, and the back surface of the cavity may be curved or hemi-spherical in shape.

However, the shape of the cavity 22 may depend on the functional requirements of the heat exchanger, including the space requirements and its use in operation. Moreover, the size and configuration of the fins 14, 16 may impact the tooling requirements that can be used to manufacture the cavity 22, which will in turn influence the size and configuration of the cavity 22. Hence, although the cavity 22 is depicted with a concave shape, the cavity 22 may have different configurations depending on the specific application of the heat exchanger.

For example, the cavity 22 may have a triangular cross section where the cavity 22 extends to a point in the direction of the air flow through the heat exchanger layer 10. Alternatively, the cavity 22 may have a rectangular cross section with a straight back surface. In this instance, the cavity 22 may have straight sides only.

As depicted in FIGS. 3*a* and 3*b*, each cavity 22 extends in a direction parallel to the fins 12, 14 and towards the central section of the heat exchanger layer 10. In the present example, the cavity 22 extends in a direction parallel to the direction in which the herringbone-shaped fins are arranged. In other words, the cavity 22 extends in a direction which is parallel to the direction of the airflow in use.

FIGS. 3*a* and 3*b* relate to a heat exchanger layer 10 including a cavity 22 at the junction between the guard fins 16 and the herringbone-shaped fins 14 at the inlet side 18 of the layer 10. However, in FIGS. 4*a* and 4*b*, the heat exchanger layer 10 is depicted as including a plurality of guard fins 16 at both the inlet side 18 and the outlet side 20 of the heat exchanger layer 10.

Accordingly, a cavity 22 is provided at the junction or boundary between each of the guard fins 16 and herringbone-shaped fins 14 on both the inlet side 18 and the outlet side 20 of the layer 10. The cavity 22 present at the junction or boundary between each guard fin 16 and herringbone-shaped find 14 at the outlet side may include any of the features described in relation to the cavities 22 located at the inlet side 18.

The cavity 22 present at the outlet side 20 may be arranged such that air flowing through the flow channels 14*a* defined by the herringbone-shaped fins 14 enters the cavity before being transferred to the flow channels 16*b* between each guard fin 16 at the outlet side 20 of the heat exchanger layer 10. This has the benefit of further reducing the pressure drop in the airflow along its path between the inlet side and outlet side to further increase the heat transfer efficiency of the heat exchanger as a whole.

Additionally, the presence of a cavity 22 at the outlet side provides a further area to act as a "crumple zone" to protect the herringbone-shaped fins 14 from impact or handling damage, as well as allowing for thermal expansion to take place as discussed above.

Figure 4A:
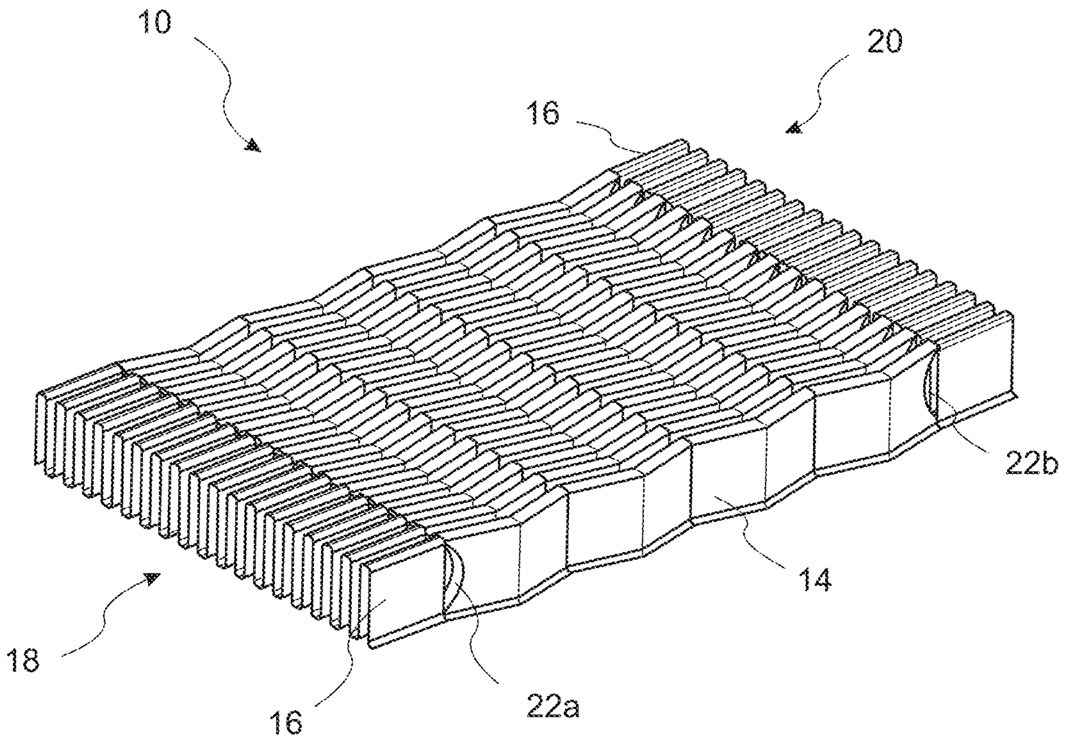
FIG. 4*a* shows a perspective view of a layer of a plate-fin heat exchanger.
Figure 4B:
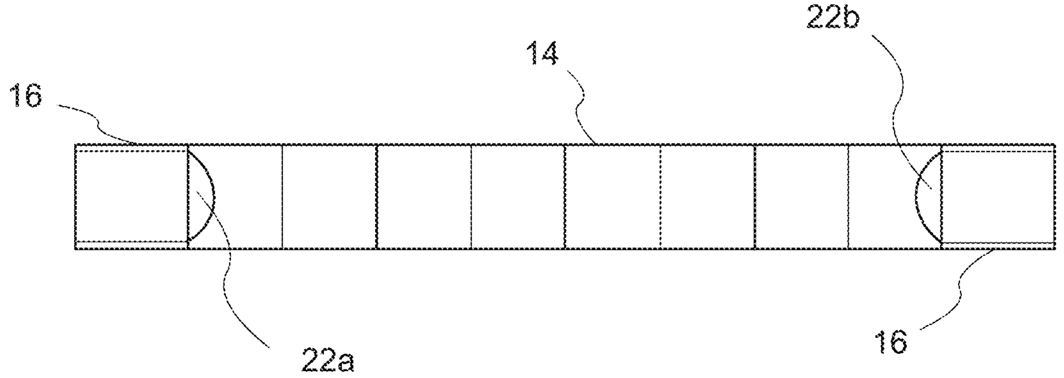
FIG. 4*b* shows a side view of a layer of a plate-fin heat exchanger.

In FIGS. 4*a* and 4*b*, the cavities 22 at the inlet side and outlet side may all be located in the herringbone-shaped fins 14 at the respective boundaries between the two fin types 14, 16. Alternatively, they may each be located within the guard fins 16, or as a further alternative they may be located within both fins 14, 16. Another option is for an arrangement where, for example, at the inlet side 18 of the layer 10, the cavity 22 at each boundary between the fins 14, 16 is located in the herringbone-shaped fins 16, while at the outlet side 20, the cavity 22 at each boundary between the fins may be located in the guard fins 16, or vice versa.

The presence of the cavity 22 at the inlet side of the heat exchanger layer may result in up to a 25% reduction of the pressure drop in the airflow as it moves from the flow channels defined by the guard fins 16 and the channels defined by the herringbone-shaped fins 14 compared to a heat exchanger layer without said cavity 22. Meanwhile, at the outlet end, the presence of a cavity 22 at each boundary between the fins 14, 16 can result in up to a 9% reduction of the pressure drop in the airflow as it moves from the flow channels defined the herringbone-shaped fins 14 and the channels defined by the guard fins 16 compared to a heat exchanger layer without said cavity 22.

Figure 5A:
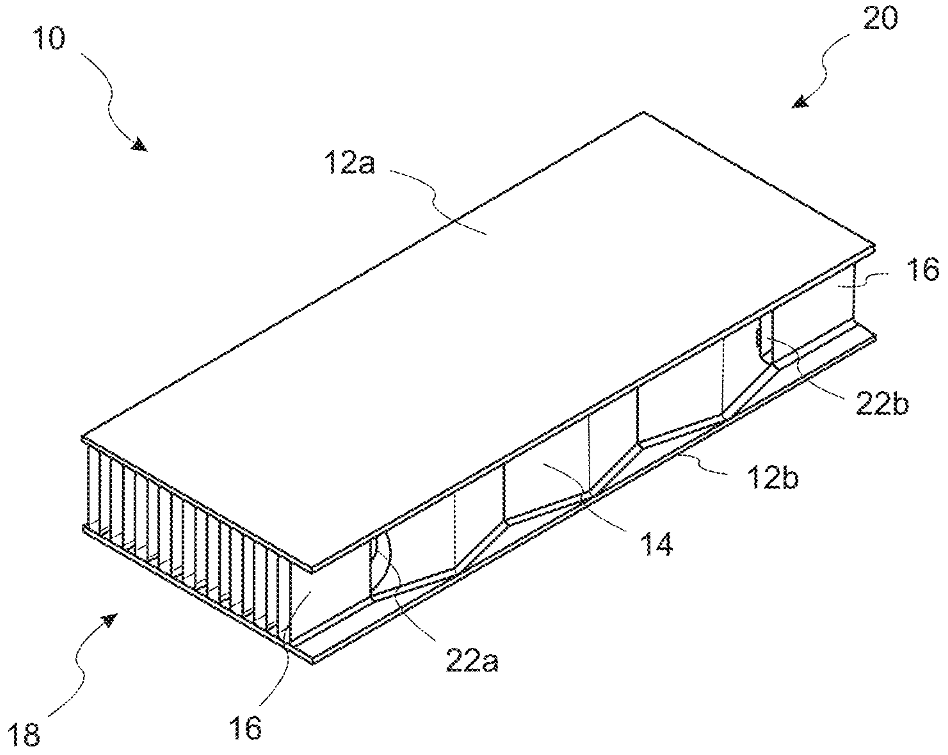
FIG. 5*a* shows a perspective view of a layer of a plate-fin heat exchanger.
Figure 5B:
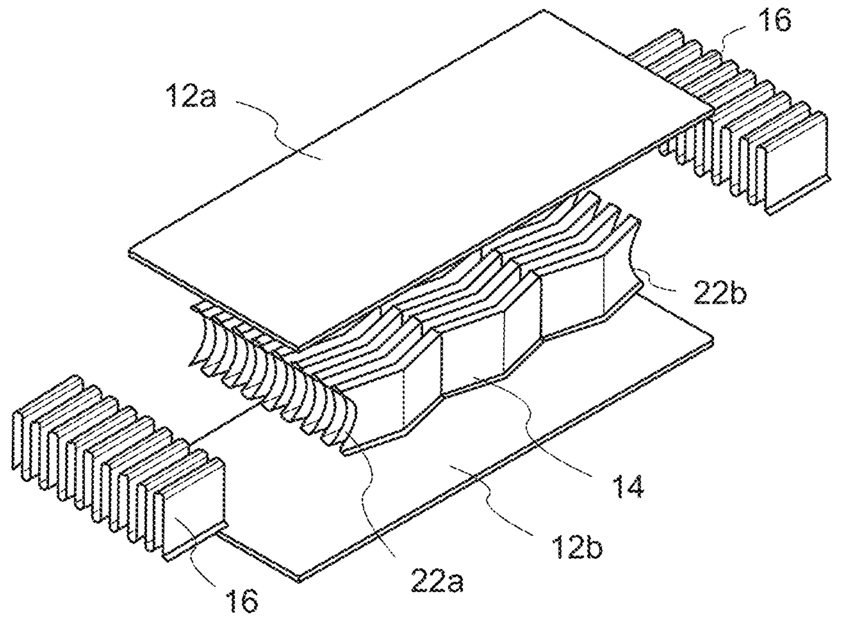
FIG. 5*b* shows an exploded view of the layer of a plate-fin heat exchanger shown in FIG. 5*a;*

FIGS. 3*a*, 3*b*, 4*a* and 4*b* primarily depict the fin arrangements 14, 16 for each layer. For completeness, FIGS. 5*a* and 5*b* show the complete layer 10 of the plate-fin heat exchanger including the fins 14, 16 with the cavities 22 at both the inlet end 18 and outlet end 20, and the top plate 12*a* and the base plate 12*b*. In addition, the exploded view of the layer 10 depicted in FIG. 5*b* clearly shows the cavities 22*a*, 22*b* formed in the herringbone-shaped fins 14.

Any of the features discussed in connection with the plates 12*a*, 12*b* provided in relation to FIGS. 1*a* and 1*b* apply for the layer 10 depicted in FIGS. 5*a* and 5*b*. In particular, the fins 14, 16 may be connected to each of the plates 12*a*, 12*b* by any means, for example brazing or welding. Moreover, a further set of fins, having the same arrangement and design as the plurality of fins 14, 16 may be present extending from the top plate 12*a* to form a second layer of the plate-fin heat exchanger adjacent to the layer 10 depicted in FIGS. 5*a* and 5*b*.

Figure 6A:
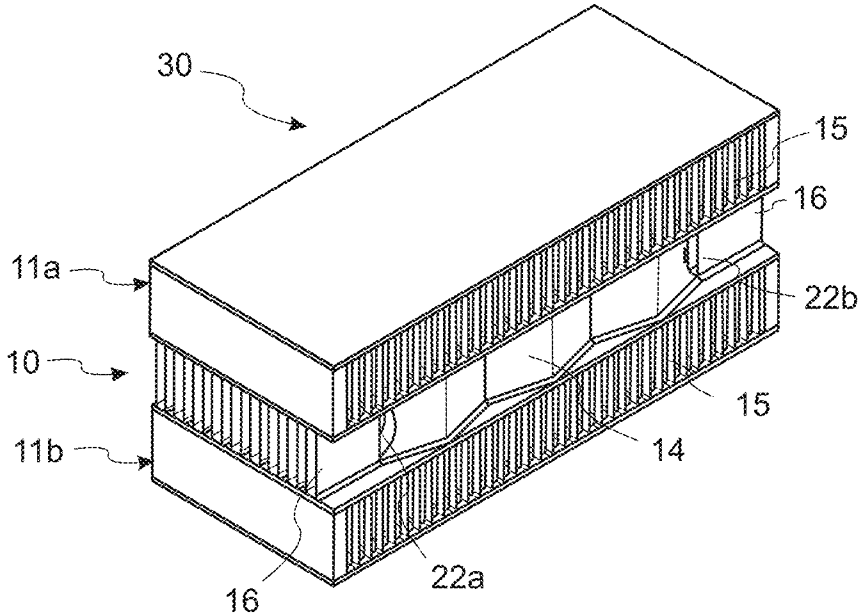
FIG. 6*a* shows a perspective view of a plate-fin heat exchanger.
Figure 6B:
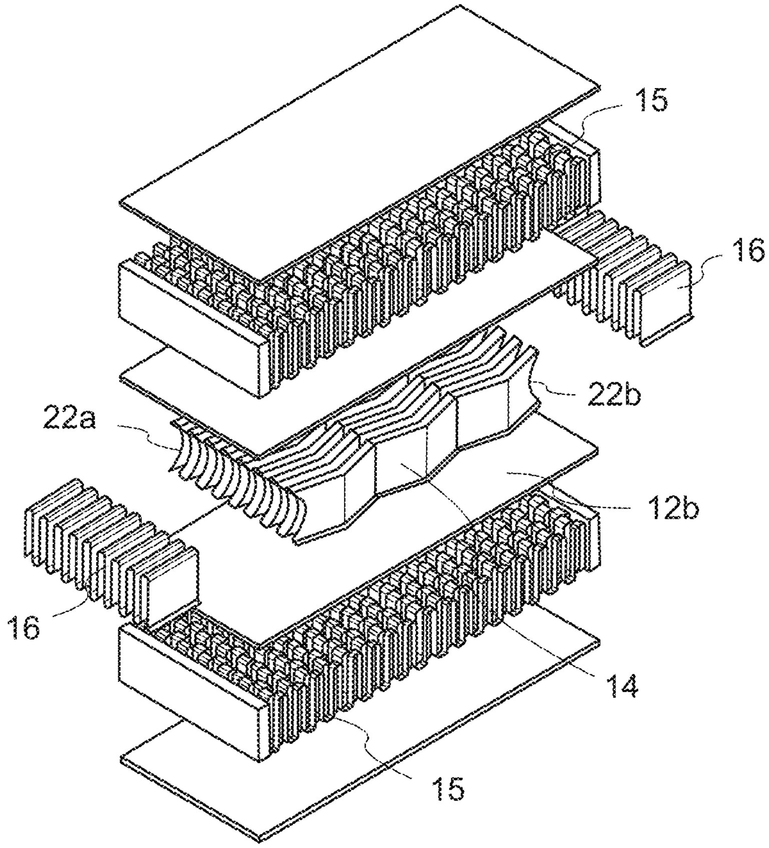
FIG. 6*b* shows an exploded view of the plate-fin heat exchanger shown in FIG. 6*a;*

As discussed above, the layer 10 of the heat exchanger may form part of a plate-fin heat exchanger 30 depicted in FIGS. 6*a* and 6*b*. The plate-fin heat exchanger 30 comprises a first layer 10 which corresponds to the layer 10 depicted in FIGS. 5*a* and 5*b*, and a first adjacent layer 11*a* and a second adjacent layer 11*b*. Each of the first and second adjacent layers 11*a* and 11*b* comprise fins 15 having a corrugated geometry, more specifically a serrated corrugation or offset-strip corrugation.

The plate-fin heat exchanger 30 may include up to 50-250 layers, and as will be appreciated, the geometry of the fins may alternate between the herringbone-shaped fins 14 and the corrugated fins of layers 11*a* and 11*b* accordingly. This alternation of layers ensures maximum heat transfer can take place between the fluid types.

In addition, the orientation of the inlets and outlets in each alternating layer of the plate-fin heat exchanger 30 are offset by 90 degrees. This means that the flow direction in each layer 10, 11*a*, 11*b* is perpendicular with respect to the adjacent layers. In other words, the heat exchanger 30 allows for a cross-flow arrangement.

Figure 7A:
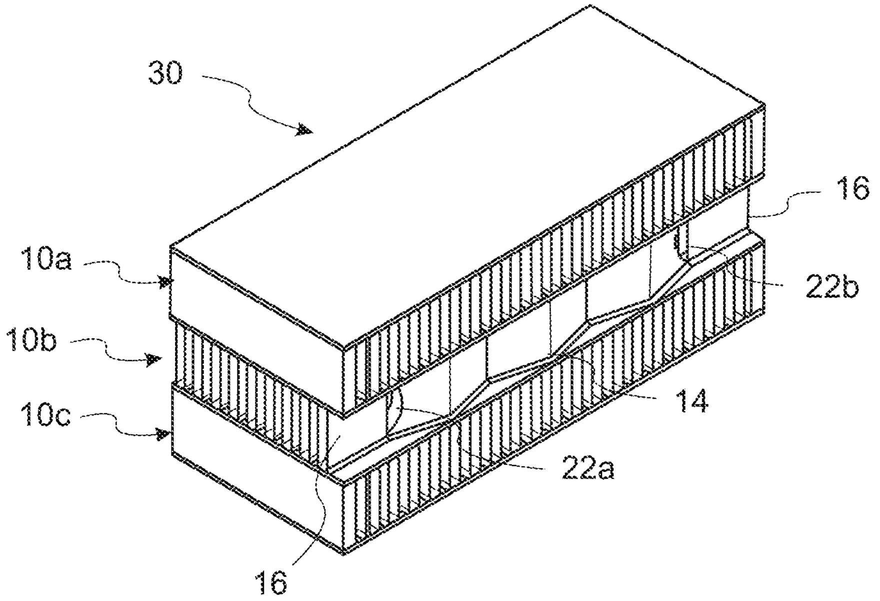
FIG. 7*a* shows a perspective view of a plate-fin heat exchanger.
Figure 7B:
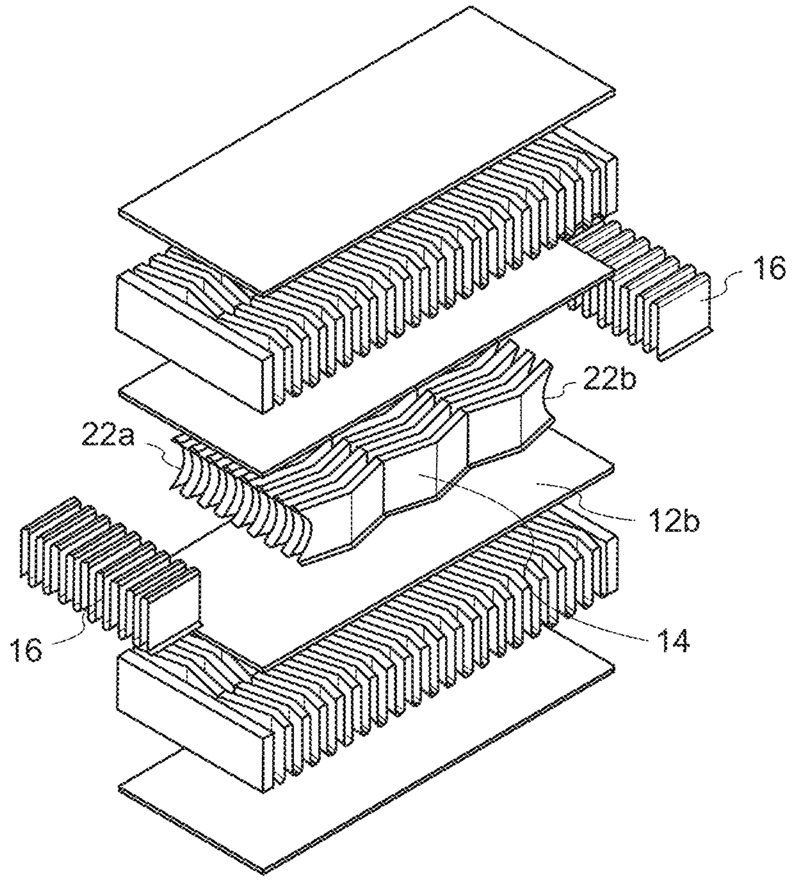
FIG. 7*b* shows an exploded view of the plate-fin heat exchanger shown in FIG. 7*a.*

Although the geometry of the plate-fin heat exchanger 30 in FIGS. 6*a* and 6*b* alternates between the two fin types, an alternative plate-fin heat exchanger 30 is depicted in FIGS. 7*a* and 7*b* which has the same fin arrangement in each layer. In particular, each layer 10*a*-10*c* has the same fin arrangement as shown in FIGS. 5*a* and 5*b*, namely a set of herringbone-shaped fins 14 in the central section of each layer, and guard fins 16 at the inlet end 18 and outlet end 20 to provide protection to the herringbone-shaped fins 14.

The orientation of the inlets and outlets in each alternating layer of the plate-fin heat exchanger 30 in FIGS. 7*a* and 7*b* is offset by 90 degrees in the same manner as the heat exchanger depicted in FIGS. 6*a* and 6*b*. Accordingly, the plate-fin heat exchanger 30 allows for a cross-flow arrangement.

The present disclosure also extends to a method for forming the heat exchanger layer 10, and the subsequent heat exchanger including a plurality of said layers 10.

The heat exchanger layer 10 may be formed of any available manufacturing technique, and the cavity 22 may be formed by removing a portion of the material of either the guard fins 16 or herringbone-shaped fins 14 using machining techniques. For example, the cavity 22 may be formed by cutting away a portion of the fins 14, 16, or alternatively by milling a portion of the fins 14, 16. As a further alternative the cavity 22 may be formed using abrasive techniques such as grinding.

It is also possible for the heat exchanger layer 10 to be formed using additive manufacturing techniques. In this scenario, the guard fins 16 and the herringbone-shaped fins 14 may be formed separately and then joined together via any joining technique, such as welding or brazing. Alternatively, the guard fins 16 and herringbone-shaped fins 14 may be formed as a single unit, albeit where the guard fins 16 are formed within a thicker profile to provide a stiffer material when compared to the herringbone-shaped fins 14.

In either scenario of additive manufacturing, the fins 14, 16 can be formed with the cavity 22 already present within the surface of the relevant fins 14, 16, without requiring a portion of the material to be removed to form the cavity 22.

The invention claimed is:

1. A layer of a plate-fin heat exchanger comprising:

an inlet side for receiving a fluid;

an outlet side;

a plurality of first fins each having a first end located at the inlet side and extending in a direction toward the outlet side to a second end to provide a plurality of first flow channels for the fluid, wherein the first end has a straight leading edge and the second end has a straight trailing edge;

a plurality of second fins each having a first end connected to the second end of each of the plurality of first fins and extending toward the outlet side to a second end to provide a plurality of second flow channels for the fluid, wherein the first end has a concave leading edge and the second end has a concave trailing edge; and a cavity formed between the straight trailing edge of each of the plurality of first fins and the concave leading edge of each of the plurality of second fins, wherein the cavity has a semi-circular cross section.

2. The layer according to claim 1, wherein the plurality of first fins comprise guard fins arranged to protect the plurality of second fins from impact.

3. The layer according to claim 2, wherein the plurality of first fins are formed of a stronger material than the plurality of second fins.

4. The layer according to claim 1, wherein the cavity is formed in an end surface of each of the first plurality of fins and/or each of the second plurality of fins, wherein the end surface is substantially perpendicular to a direction of the fluid in use.

5. The layer according to claim 1, wherein the plurality of first flow channels comprise a first geometry and the plurality of second flow channels comprise a second geometry different from the first geometry.

6. The layer according to claim 5, wherein the cavity is arranged to provide a transition region for air flow in use as air travels from the first geometry defined by the plurality of first fins and the second geometry defined by the plurality of second fins.

7. The layer according to claim 5, further comprising a plurality of third fins each having a first end connected to the second end of each of the plurality of second fins and extending to a second end at the outlet side to provide a plurality of third flow channels for the fluid, wherein the first end of each third fin has a straight leading edge and the second end of each third fin has a straight trailing edge, and wherein the plurality of third flow channels comprise a third geometry which is the same as the first geometry.

8. The layer according to claim 7, wherein the cavity is a first cavity, and wherein the layer comprises a second cavity in each of the plurality of second fins and/or each of the plurality of third fins at the boundary between the plurality of second fins and the plurality of third fins.

9. The layer according to claim 1, wherein the cavity comprises a concave depression.

10. The layer according to claim 1, wherein the plurality of second fins comprise herringbone-shape fins.

11. The layer according to claim 1, further comprising a plurality of third fins each having a first end connected to the second end of each of the plurality of second fins and extending to a second end at the outlet side to provide a plurality of third flow channels for the fluid, wherein the first end of each third fin has a straight leading edge and the second end of each third fin has a straight trailing edge.

12. The layer according to claim 11, wherein the cavity is a first cavity, and wherein the layer comprises a second cavity in each of the plurality of second fins and/or each of the plurality of third fins at the boundary between the plurality of second fins and the plurality of third fins.

13. The layer according to claim 11, wherein the plurality of third fins are formed of the same material as the plurality of first fins.

14. The layer according to claim 13, wherein the plurality of third fins are arranged to protect the plurality of second fins from impact on the outlet side.

15. A plate-fin heat exchanger comprising a plurality of layers as claimed in claim 1.

16. A method of manufacturing a layer of a heat exchanger as claimed in claim 1, the method comprising:

providing a base plate;

connecting the plurality of first fins to the base plate;

connecting the plurality of second fins to the base plate;

joining the second end, with a straight trailing edge, of each of the plurality of first fins to the first end, with a concave leading edge, of each of the plurality of second fins;

forming the cavity at the boundary between the straight trailing edge of each of the plurality of first fins and the concave leading edge of each of the plurality of second fins, wherein the cavity has a semi-circular cross section.

17. The method as claimed in claim 16, wherein the step of forming the cavity comprises using machining techniques including one of cutting, milling or abrasion.

18. The method as claimed in claim 16, wherein the plurality of first fins and the plurality of second fins are formed separately using additive manufacturing techniques, and then are joined together by welding or brazing.

19. The method as claimed in claim 16, wherein the plurality of first fins and the plurality of second fins are formed as a single unit using additive manufacturing techniques, the plurality of first fins being formed with a thicker profile to provide more stiffness than the plurality of second fins.

20. The method as claimed in claim 16, wherein forming the cavity in each of the plurality of first fins and/or each of the plurality of second fins is achieve by forming the plurality of first fins and the plurality of second fins using additive manufacturing techniques with the cavity already present.

* * * * *